(12) United States Patent
Jonsson et al.

(10) Patent No.: US 7,376,195 B2
(45) Date of Patent: May 20, 2008

(54) DIGITAL COMMUNICATION SYSTEMS HAVING DECREASED MEMORY

(75) Inventors: Elias Jonsson, Malmö (SE); Andreas Cedergren, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 754 days.

(21) Appl. No.: 10/763,755

(22) Filed: Jan. 23, 2004

(65) Prior Publication Data
US 2005/0163200 A1   Jul. 28, 2005

(51) Int. Cl.
*H04L 5/12* (2006.01)
(52) U.S. Cl. ............... 375/262; 375/265; 375/341; 375/348; 714/774; 714/780; 714/794
(58) Field of Classification Search ........... 375/140, 375/141, 144, 147, 148, 260–262, 264, 265, 375/341, 346, 348, 349; 714/793–795, 780, 714/774; 455/52.1–52.3, 65, 296, 303
See application file for complete search history.

(56) References Cited

U.S. PATENT DOCUMENTS

| 5,305,349 | A | 4/1994 | Dent | |
|---|---|---|---|---|
| 6,363,104 | B1 | 3/2002 | Bottomley | |
| 6,714,585 | B1 | 3/2004 | Wang et al. | |
| 6,789,225 | B2* | 9/2004 | Dorney et al. | 714/752 |
| 6,907,084 | B2* | 6/2005 | Jeong | 375/261 |
| 7,076,000 | B2* | 7/2006 | Rodriguez | 375/262 |
| 7,197,090 | B1* | 3/2007 | Berger et al. | 375/317 |
| 2001/0028677 | A1 | 10/2001 | Wang et al. | |
| 2004/0233976 | A1* | 11/2004 | Han et al. | |
| 2004/0258173 | A1* | 12/2004 | Wang | |
| 2004/0264591 | A1* | 12/2004 | Malm et al. | |

FOREIGN PATENT DOCUMENTS

| EP | 1 124 346 A1 | 8/2001 |
|---|---|---|
| EP | 1 207 714 A1 | 5/2002 |
| EP | 1 343 285 A1 | 9/2003 |
| WO | WO 01/01594 A1 | 1/2001 |

OTHER PUBLICATIONS

PCT International Search Report, dated Apr. 6, 2005, in connection with International Application No. PCT/EP2005/000431.
PCT Written Opinion, dated Apr. 6, 2005, in connection with International Application No. PCT/EP2005/000431.
PCT Second Written Opinion, dated Feb. 8, 2006, in connection with International Application No. PCT/EP2005/000431.
Turin, G., "Introduction to Spread-Spectrum Antimultipath Techniques and Their Application to Urban Digital Radio", *Proc. IEEE*, vol. 68, pp. 328-353 (Mar. 1980).
European Search Report dated Aug. 23, 2004 in connection with U.S. Appl. No. 10/763,755.

(Continued)

*Primary Examiner*—Dac V. Ha
(74) *Attorney, Agent, or Firm*—Potomac Patent Group PLLC (57) ABSTRACT

Methods and apparatus that do not require a memory between the combiner and decision boundary estimator in a digital communications receiver and that enjoy unaltered performance are described. The methods and apparatus include new ways of estimating bit decision boundaries and may also include new ways of estimating soft bit values.

40 Claims, 7 Drawing Sheets

OTHER PUBLICATIONS

"Comparison on RLC HARQ and fast HARQ complexity", TSG-RAN Working Group 1 meeting #15, Berlin, Germany, Aug. 22-25, 2000; TSGR1(00)1083:1-4.

"Digital Baseband Architecture Scenarios for a Multi-Mode Radio", information society technologies, Project MuMoR, IST-2001-34561: 1-63

Falahati, Sorour et al., "Hybrid type-II ARQ/AMS and Scheduling using Channel Prediction for Downlink Packet Transmission on Fading Channels".

Kolding, Troels E. et al., Performance Aspects of WCDMA Systems with High Speed Downlink Packet Access (HSDPA), Nokia Networks, Aalborg R&D, Denmark.

"Multiplexing and channel coding (FDD), Release 5", 3GPP TS 25.212, V 5.6.0, (Sep. 2003).

Tantikovit, Sukvasant et al., "A New RAKE Receiver Structure for the Forward-Link of W-CDMA Systems", IEICE Trans. Commun., vol. E85-B, No. 6: 1218-1222, Jun. 2002.

Vivier, Guillaume, "Simulations of HARQ for Turbo-coded services in UMTS-TDD", Motorola Labs -Centre de Recherche de Motorola-Paris.

Wehinger, Joachim, "Performance Analysis of Iterative CDMA Receivers with Channel Estimation in Flat Fading Channels", Mobile Communications Group, Vienna Telecomm. Research Center (ftw.), Austria.

\* cited by examiner

DIGITAL COMMUNICATION SYSTEMS HAVING DECREASED MEMORY

BACKGROUND

This invention relates to telecommunication systems and more particularly to methods and apparatus requiring less memory in radio systems, such as a wideband code division multiple access (WCDMA) system.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and WCDMA telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS standard. This application focusses on WCDMA systems for simplicity, but it will be understood that the principles described in this application can be implemented in other digital communication systems.

Figure 1:
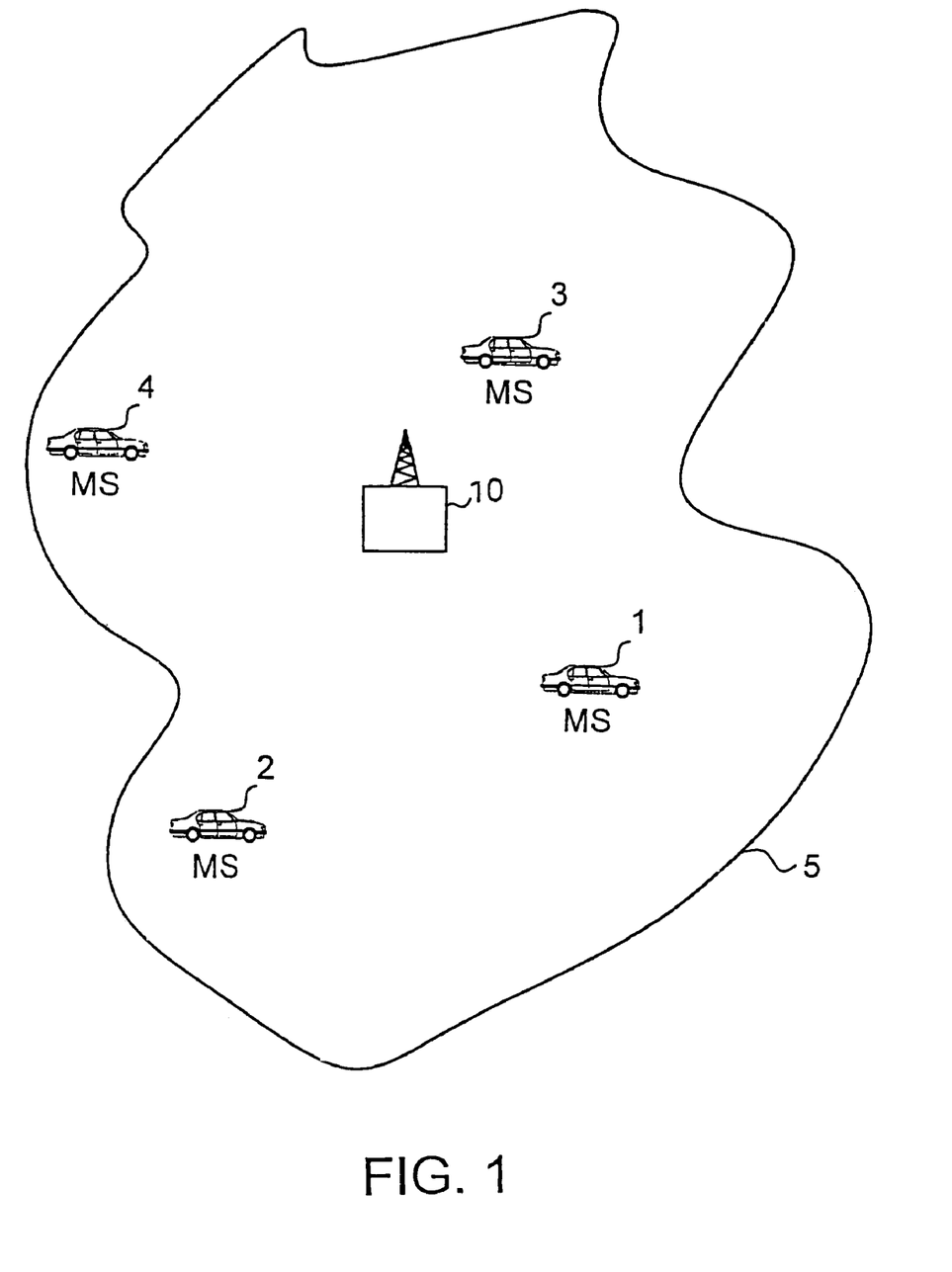
FIG. 1 depicts a typical communication system.

FIG. 1 depicts a communication system such as a WCDMA system that includes a base station (BS) 10 handling connections with four mobile stations (MSs) 1, 2, 3, 4 that each use downlink (i.e., base-to-mobile or forward) and uplink (i.e., mobile-to-base or reverse) channels. In the downlink, BS 10 transmits to each mobile at a respective power level, and the signals transmitted by BS 10 are spread using orthogonal code words. In the uplink, MS 1-MS 4 transmit to BS 10 at respective power levels. Although not shown, BS 10 also communicates with a radio network controller (RNC), which in turn communicates with a public switched telephone network (PSTN).

WCDMA is based on direct-sequence spread-spectrum techniques. Two different codes are used for separating base stations and physical channels in the downlink (base-to-terminal) direction. Scrambling codes are pseudo-noise (pn) sequences that are mainly used for separating the base stations or cells from each other. Channelization codes are orthogonal sequences that are used for separating different physical channels (terminals or users) in each cell or under each scrambling code. User terminals communicate with the system through, for example, respective dedicated physical channels (DPCHs). It will be appreciated that WCDMA terminology is used here and that other systems have corresponding terminology. Scrambling and channelization codes are well known in the art.

Figure 2:
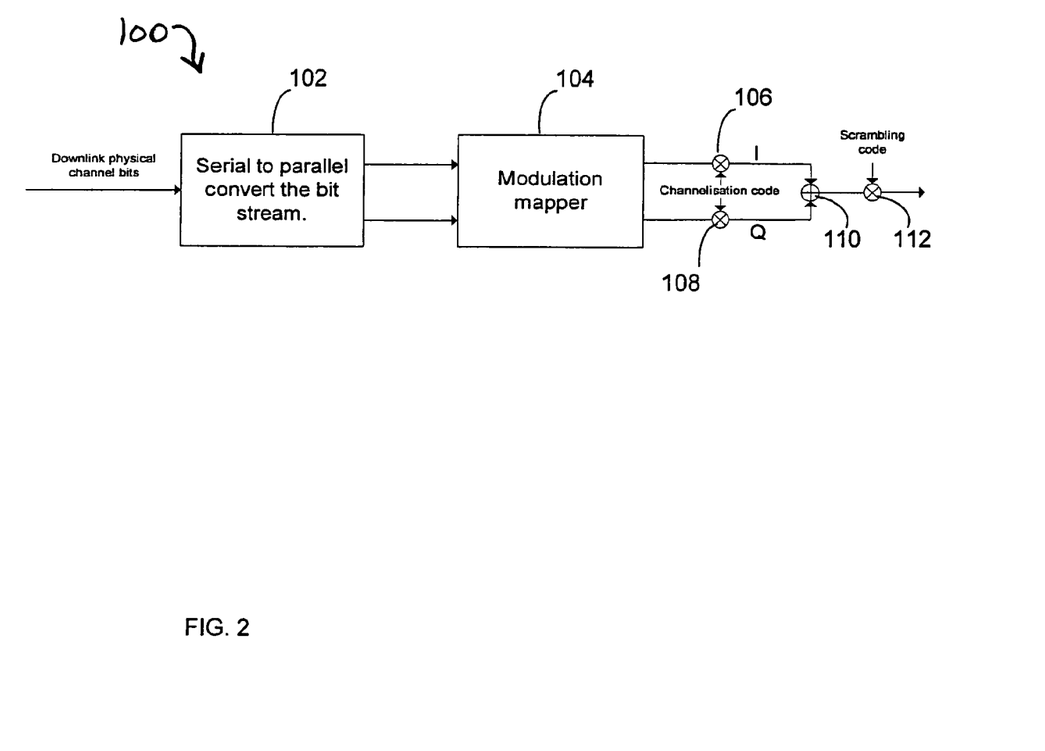
FIG. 2 is a block diagram of a typical transmitter suitable for the communication system.

The signals transmitted in the exemplary WCDMA system depicted in FIG. 1 can be formed with a transmitter system 100 such as that depicted in FIG. 2. An information data stream to be transmitted, such as a serial stream of bits to be sent on a downlink physical channel, is converted from serial form to parallel form by a suitable converter 102, and the now-parallel bits to be sent are provided to a modulation mapper 104 that transforms groups of bits into respective modulation symbols. WCDMA and other transmitters employ quadrature modulation, so the mapper 104 generates streams of in-phase (I) and quadrature (Q) symbols that are provided to respective multipliers 106, 108 that combine the symbols with a selected channelization code. As shown in FIG. 2, the resultant streams are provided to a combiner 110, and then the resultant combined stream is provided to another multiplier 112 that combines the combined stream with a selected scrambling code. The resultant channelized, scrambled signal may then be further processed and impressed on a suitable carrier signal (not shown) for transmission.

The multiplications are usually carried out by exclusive-OR operations, and the information data stream and the scrambling code can have the same or different bit rates. Each information data stream or channel is allocated a unique channelization code, and a plurality of coded information signals simultaneously modulate a radio-frequency carrier signal.

In order to accommodate the increasing demand for higher data rates in wireless user equipment (UE), such as cellular telephones, combination cellular telephones-personal digital assistants, and wireless-enabled personal computers, a high-speed downlink shared channel (HS-DSCH) was introduced in WCDMA. The HS-DSCH has a spreading factor of sixteen and can use several channelization codes simultaneously, with modulation being either quadrature phase shift keying (QPSK) or 16-ary quadrature amplitude modulation (16QAM). Each transmission time interval (TTI) includes one transport block, and the length of a TTI is three slots. After encoding, interleaving, and rate matching, the bits to be transmitted are distributed over one or more channelization codes. This is described in "Multiplexing and channel coding (FDD)", 3GPP Technical Specification (TS) 25.212 ver. 5.6.0 (September 2003), for example. Since the chip rate in a direct-sequence CDMA system is typically constant, a higher spreading factor generally corresponds to a lower information bit-rate.

Figure 3:
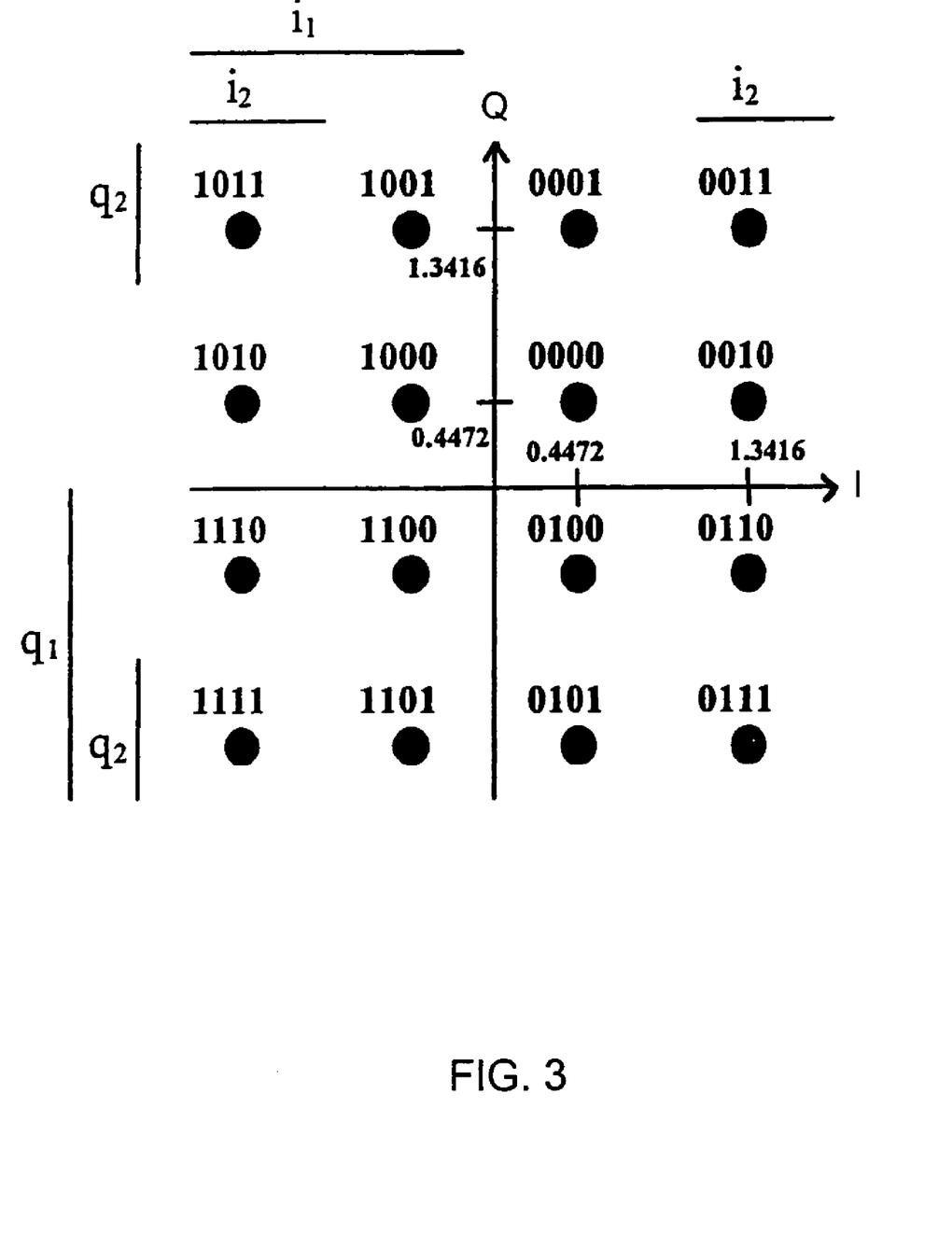
FIG. 3 depicts a 16QAM signal constellation and mapping.

The transmitter 100 depicted in FIG. 2 is suitable for the HS-DSCH, and the 16QAM symbol constellation generated by the modulation mapper 104 is depicted in FIG. 3. The region marked $i_1$ is where the first bit is mapped when it is one; the region marked $q_1$ is where the second bit is mapped when it is one; the region marked $i_2$ is where the third bit is mapped when it is one; and the region marked $q_2$ is where the fourth bit is mapped when it is one. It should be noted that input binary zeroes are mapped to ones and input binary ones are mapped to negative ones.

At a mobile station or other receiver, the modulated carrier signal is processed to produce an estimate of the original information data stream intended for the receiver. This process is known as demodulation. The composite received baseband spread signal is commonly provided to a rake processor that includes a number of "fingers", or de-spreaders, that are each assigned to respective ones of selected components, such as multipath echoes or images, in the received signal. Each finger combines a received component with the scrambling sequence and the channelization code so as to de-spread the received composite signal. The rake processor typically de-spreads both sent information data and pilot or training symbols that are included in the composite signal.

Various aspects of rake receivers are described in G. Turin, "Introduction to Spread-Spectrum Antimultipath Techniques and Their Application to Urban Digital Radio", *Proc. IEEE*, vol. 68, pp. 328-353 (March 1980); U.S. Pat. No. 5,305,349 to Dent for "Quantized Coherent Rake Receiver"; U.S. Patent Application Publication No. 2001/0028677 by Wang et al. for "Apparatus and Methods for Finger Delay Selection in Rake Receivers"; and U.S. Patent Applications No. 09/165,647 filed on Oct. 2, 1998, by G.

Bottomley for "Method and Apparatus for Interference Cancellation in a Rake Receiver" and No. 09/344,898 filed on Jun. 25, 1999, by Wang et al. for "Multi-Stage Rake Combining Methods and Apparatus".

Figure 4:
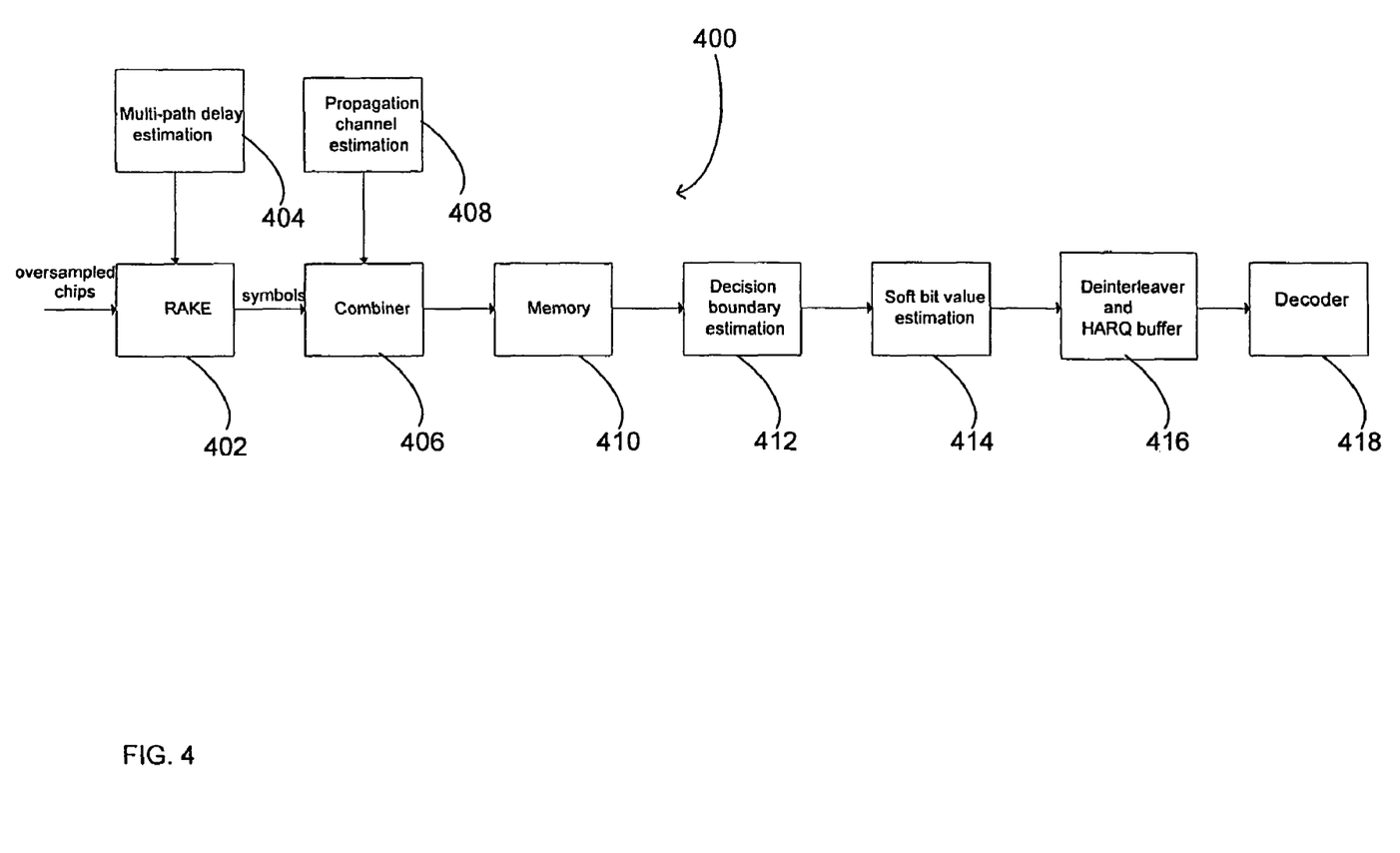
FIG. 4 is a block diagram of a typical receiver for a high-speed downlink shared channel.

FIG. 4 is a block diagram of a typical HS-DSCH receiver 400. A rake processor 402 receives over-sampled chip values from one or more analog-to-digital converters (not shown). The rake processor 402 sub-samples the received over-sampled chip sequence and multiplies each chip with the corresponding scrambling and channelization codes. The first chip to select is determined by the appropriate multi-path delay, and these delays are determined by a suitable path estimator 404. The output of the rake processor is a set of symbols corresponding to different channelization codes and multi-path delays. It will be understood that FIG. 4 omits any components that might be used for recovering the baseband modulation of a radio-frequency carrier signal.

A combiner 406 multiplies the symbols for each delay with the complex conjugate of an estimate of the impulse response of the propagation channel for the corresponding delay and sums the contributions over the delays. The channel estimates are produced by a suitable channel estimator 408. The combiner 406 thus reproduces the modulated complex symbols that were transmitted. Not shown in FIG. 4 are various registers or memories that are usually used in practice to enable received signals to be processed while new signals are received. For example, a memory is placed before the rake processor 402 for so-called over-sampled chip buffering or after the rake processor for so-called symbol buffering.

When receiving 16QAM-modulated symbols, the constellation of which is depicted in FIG. 3, the receiver has to determine the distance d between the Q-axis and the point on the I-axis that is half-way between the first and second columns of constellation points in the right half-plane in order to decide which symbols have been received. As depicted in FIG. 3, the first column of points is located at 0.4472 on the I-axis and the second column of points is located at 1.3416, so the distance d is 0.8944. Because of the symmetry of the constellation, the determined distance d separates all of the constellation points into a uniform pattern of squares.

The distance d is proportional to the amplitude of the received signal, and that amplitude varies with time due to signal fading in the propagation channel. Thus, when the receiver is in a fading dip, the distance d is small, and when the receiver is on a fading peak, the distance d is large. Accordingly, the receiver must regularly update its determination of the distance d. FIG. 4 shows a memory 410 after the combiner 406 that stores a number of complex symbols generated by the combiner. A decision boundary estimator 412 computes the distance d separately for each channelization code based on respective symbols in the memory 410 and on respective previously computed values of the distance d for each channelization code. Using the estimates of the distance d computed by the estimator 412, a soft bit value estimator 414 computes so-called soft bit values from the complex symbols stored in the memory 410.

The computed soft bit values may be stored in a memory called a Hybrid ARQ (HARQ) buffer that implements hybrid automatic repeat request (HARQ). HARQ is a combination (a hybrid) of ARQ and forward error correction coding (FEC), which are well known techniques for increasing the probability of successful signal reception in the face of channel noise and interference from other users. Another known error handling technique is interleaving, in which symbols are interleaved, or shuffled out of order, at the transmitter and correspondingly deinterleaved, or re-ordered, at the receiver. HARQ, interleaving, and the HS-DSCH are described in, for example, the 3GPP TS 25.212 ver. 5.6.0 (September 2003) standard cited above.

FIG. 4 depicts the HARQ and deinterleaving functionality in a combined deinterleaver/HARQ buffer 416. The computed soft bit values are not removed from the HARQ buffer 416 until the transmitted transport block has been decoded correctly by a suitable decoder 418 or when higher signalling layers inform the HARQ buffer to clear the soft bit values. Multiple retransmissions may occur for a given block until it has been decoded correctly. The soft bit values from each retransmission are combined and stored in the HARQ buffer 416. The transmitter, such as a cellular base station, is eventually informed, for example via an uplink high-speed dedicated physical control channel (HS-DPCCH), that the block has been received correctly.

Having the memory 410 between the combiner 406 and the decision boundary estimator 412 as in FIG. 4 is costly in several ways. For example, the memory size must be on the order of five kilobits (5 kbits), and this requires a corresponding area on one of the integrated circuit (IC) chips used for the receiver 400. The chip die area could be reduced if the memory 410 could be eliminated.

SUMMARY

Applicants have developed methods and apparatus that do not require a memory between the combiner and decision boundary estimator and that enjoy unaltered performance. Applicants' methods and apparatus include new ways of estimating the decision boundary and may also include new ways of estimating soft bit values.

In one aspect of Applicants' invention, a receiver includes a path estimator that selects at least one multi-path delay for received complex symbols; a rake processor that multiplies chips in a chip sequence with at least a corresponding channelization code based on at least one multi-path delay selected by the path estimator and generates a set of symbols corresponding to the channelization codes and multi-path delays; a channel estimator that generates estimates of an impulse response of the propagation channel for the corresponding multi-path delay; and a combiner that multiplies symbols for a multi-path delay with complex conjugates of corresponding impulse response estimates generated by the channel estimator and reproduces the modulated symbols that were transmitted. The receiver further includes a decision boundary estimator/latch controller that generates estimates of a decision boundary based on reproduced modulated symbols; a latch that is responsive to the decision boundary estimator/latch controller; a soft bit value estimator that generates, for respective channelization codes, estimates of bit values of complex symbols based on the decision boundary estimates; and a decoder. When the latch is in a first state, the decision boundary estimator generates decision boundary estimates and the soft bit value estimator does not generate soft bit values, and when the latch is in a second state, the decision boundary estimator generates decision boundary estimates and the soft bit value estimator generates soft bit values. Decision boundary estimates used for symbols from a channelization code are generated from symbols from at least one different channelization code.

In another aspect of the invention, a method in a receiver of determining decision boundary estimates based on received symbols from one or more channelization codes includes the step of determining a decision boundary for a respective channelization code using received symbols for at least one other channelization code and at least one decision boundary estimate determined for another channelization code.

In another aspect of the invention, a method of decision boundary estimation and soft bit value estimation includes the steps of running a combiner for M symbols of a channelization code n; generating soft bit value estimates from an output of the combiner; determining a sample decision boundary estimate based on the M symbols; and updating the sample decision boundary estimate based on a variable $d_\Sigma^{(n)}$ that sums a sample decision boundary $d^{(n)}$ over a time interval corresponding to M·N symbols and on a variable $d_{filter,I}$ that reflects a history of the variable $d_\Sigma^{(n)}$.

In still another aspect of the invention, a computer-readable medium contains a computer program for determining decision boundary estimates based on received symbols from one or more channelization codes in a receiver. The computer program performs the step of determining a decision boundary for a respective channelization code using received symbols for at least one other channelization code and at least one decision boundary estimate determined for another channelization code.

BRIEF DESCRIPTION OF THE DRAWINGS

The objects and advantages of Applicants' invention will be apparent from reading this description in conjunction with the drawings, in which.

DETAILED DESCRIPTION

Figure 5:
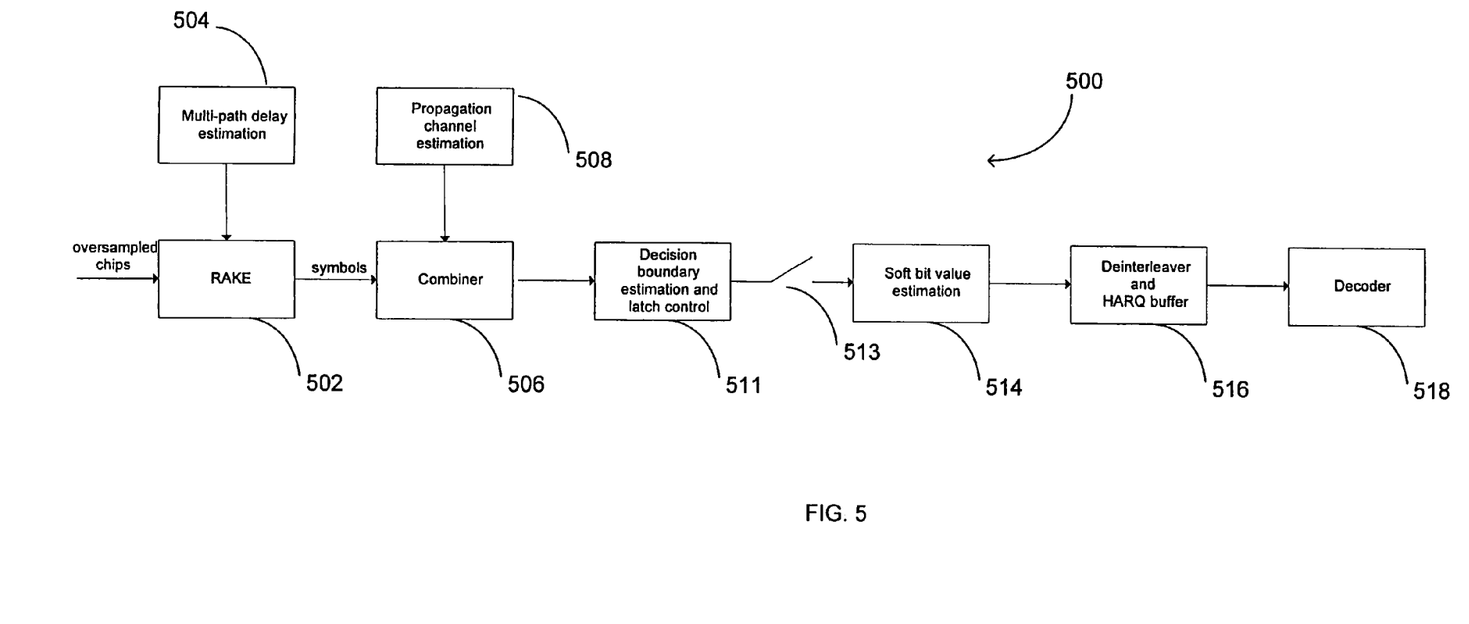
FIG. 5 is a block diagram of an exemplary embodiment of Applicants' receiver for a high-speed downlink shared channel.

FIG. 5 is a block diagram of an exemplary embodiment of Applicants' receiver 500 for a channel such as the HS-DSCH that has advantageously low memory. Such a receiver can be implemented in the base band IC chip of a UMTS terminal or even in software executed by a suitable processor. Applicants' exemplary receiver 500 has a rake processor 502, a path estimator 504, a combiner 506, a channel estimator 508, a soft bit value estimator 514, a deinterleaver/HARQ buffer 516, and a decoder 518 that are comparable to the like components of the receiver 400 depicted in FIG. 4.

Applicants' receiver 500 differs from the receiver 400 in that it has no memory comparable to the memory 410. Applicants' receiver 500 includes a decision boundary estimator/latch controller 511 and a latch 513, which determines when the receiver 500 computes the decision boundary estimate without generating soft values, and when the receiver 500 computes the decision boundary estimate and at the same time generates soft bit values. The operation of the estimator/controller 511 and latch 513 may be understood from an example, in which it is assumed that the receiver 500 is receiving a plurality N of channelization codes, which may be respectively numbered n=0, 1, . . . , N−1, and that the receiver updates its estimate of the decision boundary every M·N symbols or equivalently every M symbols for each channelization code. It will be understood that the numbering of the N channelization codes is arbitrary.

To start the example, the latch 513 is set such that the decision boundary estimator estimates the boundary for a channelization code, say, code n=0, and such that the soft bit value estimator 514 does not generate soft bit values. This is to say that the latch 513 is open as shown in FIG. 5. Thus, the receiver 500 runs only either the rake processor 502 and combiner 506 or just the combiner 506, depending on whether the receiver implements either over-sampled chip buffering or symbol buffering, and their associated components, and the decision boundary estimator 511, which computes an estimate.

Continuing the example, the rake processor 502 and combiner 506 or just the combiner 506 are/is rerun for the channelization code n=0 using the previously computed decision boundary estimate. Next, the combiner 506 is run for another channelization code, say, code n=1, and soft bit value estimates are generated by the estimator 514 based on the decision boundary estimate computed for the channelization code n=0. This is to say that the latch 513 is closed. At the same time, a new decision boundary estimate using the channelization code n=1 symbols is computed by the estimator/controller 511. This procedure is repeated for each remaining channelization code n', i.e., soft bit value estimates are generated based on the decision boundary estimate computed for channelization code n'−1 and a decision boundary estimate is computed for channelization code n', until all channelization codes have been processed.

It can thus be understood that Applicants' receiver 500 implements a method in which one or more decision boundary estimates based on symbols from one or more channelization codes are used for soft bit value estimation for a different channelization code. Simulation results show that Applicants' receiver has substantially the same performance as a receiver that implements a method in which the decision boundary estimate based on symbols from one channelization code is used for soft bit value estimation for that same channelization code.

Figure 6:
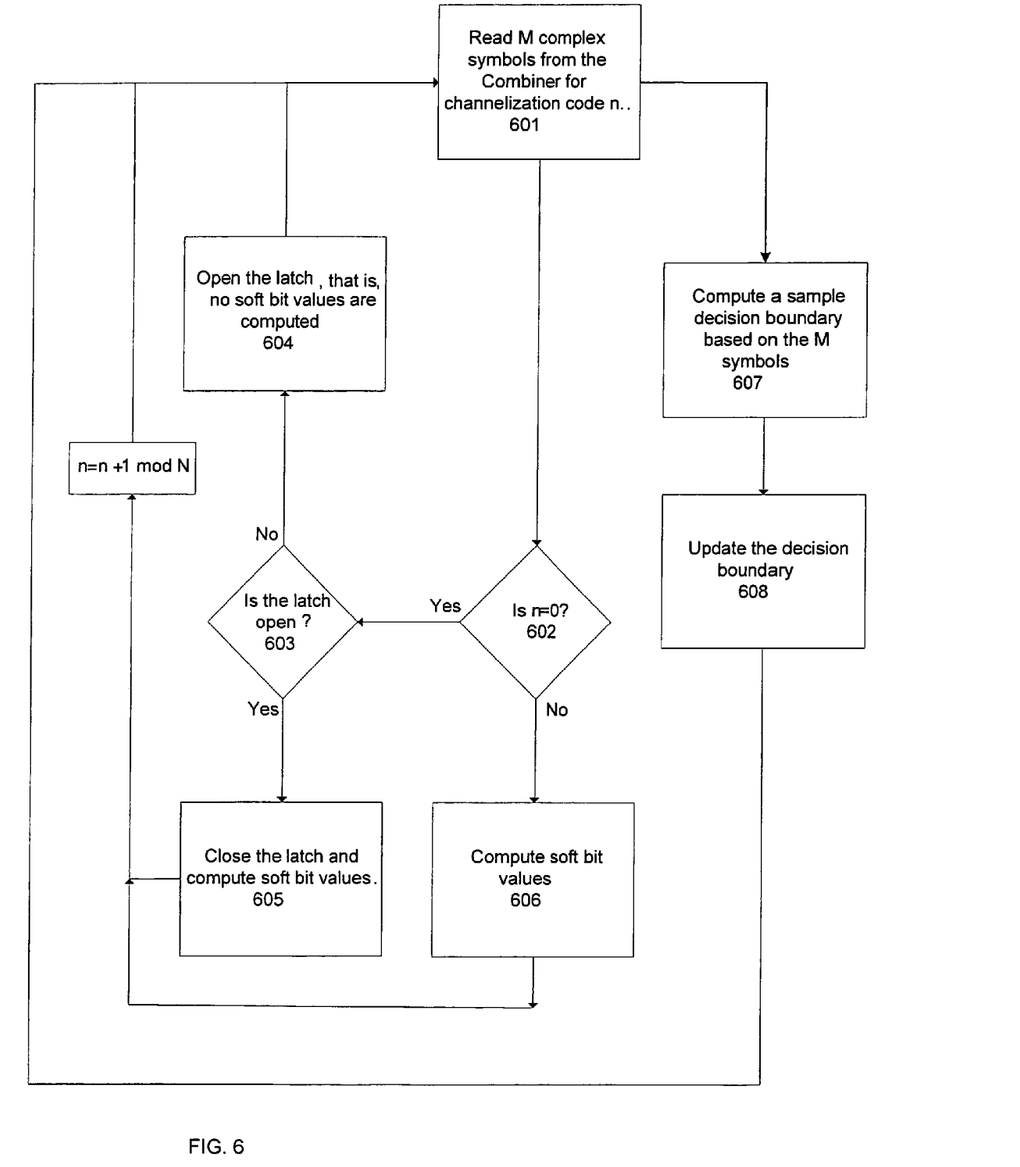
FIG. 6 is a flow chart of a method of decision boundary estimation, latch control, and soft bit value estimation.

FIG. 6 is a flow chart of a method that can be implemented by the receiver 500 in the decision boundary estimator/latch controller 511, latch 513, and soft bit value estimator 514. In step 601, M complex symbols s are read from the combiner 506 for a channelization code, say, code n=0. Such reading usually involves running the combiner 506 or the rake processor 502 and the combiner 506, depending on the type of buffering, if any, as noted above. It should be observed that reading a channelization code such as n=0 twice in a row entails reading the same M complex symbols from the combiner 506. In the case in which there is only one channelization code in use, i.e., N=1, the M symbols read from the combiner 506 are incremented after the second time they are read.

Step 602 determines whether the first channelization code, say, code n=0, is being processed. If the first channelization code is being processed, then whether the latch 513 is open is determined (step 603). If the latch is not open, there is no decision boundary estimate available to generate soft bit value estimates because this is the first code and an estimate has not yet been computed. Thus, the latch 513 is opened by the estimator/controller 511 (step 604), and the combiner 506 is run for M symbols (step 601) in order to enable computation of a sample decision boundary estimate by the estimator/controller (see step 607), without computation of soft bit value estimates by the estimator 514. If the latch 513 is determined in step 603 to be open, the latch is closed and soft bit value estimates are generated (step 605) by the estimator 514 using the decision boundary estimate available from the estimator/controller 511.

If step 602 determines that the first channelization code is not being processed, soft bit value estimates are generated based on the last available decision boundary estimate in step 606. Soft bit value estimates can, for example, be generated in steps 605, 606 as follows. Let s be a complex symbol representing four soft bit values $b_1$, $b_2$, $b_3$, $b_4$ and let d be the decision boundary. Then, the soft bit value estimates are given by:

$\tilde{b}_1$=Re s $\tilde{b}_2$=Im s $\tilde{b}_3 = \rho(d-\text{Re } s)$ for Re s>0

$\tilde{b}_3 = \rho(d+\text{Re } s)$ for Re s≤0

$\tilde{b}_4 = \rho(d-\text{Im } s)$ for Im s>0

$\tilde{b}_4 = \rho(d+\text{Im } s)$ for Im s≤0 where Re s is the real part of s, Im s is the imaginary part of s, and p is a factor that compensates for the limited resolutions, or bit widths, of the soft bit value estimates $\tilde{b}_1$, $\tilde{b}_2$, $\tilde{b}_3$, $\tilde{b}_4$ in the computations and for the better reliability of $\tilde{b}_1$, $\tilde{b}_2$, which do not depend on an estimate of the decision boundary d. It is currently believed that suitable values of ρ are $0<\rho\leq 1$ and that a particularly suitable value is $\rho=0.75$. After steps 605, 606, the process flow returns to step 601, and continues for the next channelization code n+1 until all N codes have been processed.

In step 607, a sample decision boundary $\hat{d}^{(n)}$ based on M complex symbols s from a channelization code n can be computed according to, for example, the following:

$$\hat{d}^{(n)} = \frac{\kappa}{2M} \sum_{m=1}^{M} |\text{Re } s_m| + |\text{Im } s_m|$$

where κ is a factor that compensates for folding in noise that causes over-estimating the sample decision boundary $\hat{d}^{(n)}$. It is currently believed that suitable values of κ are $0<\kappa\leq 1$ and that a particularly suitable value is $\kappa=0.95$. It will be noted that the decision boundary calculations (step 607 and 608) by the estimator/controller 511 can be performed in parallel or serial with the latch controlling the soft bit value estimations (step 602-606) by the controller 511 and the estimator 514.

In step 608, the sample decision boundary is updated, for example in the following way. Let $d_\Sigma^{(n)}$ be a temporary variable that sums sample decision boundaries $\hat{d}^{(n)}$ over a time interval corresponding to M·N complex symbols. The variable $d_\Sigma^{(n)}$ is given by:

$$d_\Sigma^{(n)} = \begin{cases} \hat{d}^{(0)}, & n=0 \\ d_\Sigma^{(n-1)} + \hat{d}^{(n)}, & n \neq 0 \end{cases}$$

where n is the index identifying the N channelization codes as used above. Also let $d_{filter,I}$ reflect the history of the variable $d_\Sigma^{(n)}$ in a manner that will be clear from the following. The decision boundary estimate $d_0$ to be applied for the code n=0 in the soft bit value estimation is:

$$d_0 = (1-\alpha)d_{filter,I} + \alpha d_\Sigma^{(0)}$$

where α is a filter parameter. The decision boundary estimates $d_n$ to be applied for the codes n=1, 2, . . . , N-1 in the soft bit value estimation are:

$$d_n = (1-\alpha)d_{filter,I} + \alpha\frac{1}{n}d_\Sigma^{(n-1)}.$$

It will be seen that the sample decision boundary $\hat{d}^{(n)}$ is included in the decision boundary estimate $d_n$ only for the first channelization code n=0 and that the other codes n do not include the sample decision boundary $\hat{d}^{(n)}$ for channelization code n in their decision boundaries $d_n$. Once sample decision boundaries $\hat{d}^{(n)}$ have been computed for all of the N codes, $d_{filter,I}$ is updated according to:

$$d_{filter,I+1} = (1-\alpha)d_{filter,I} + \alpha\frac{1}{N}d_\Sigma^{(N)}.$$

The filter parameter a is advantageously selected as approximately min(c$f_D$·M/160·1500, 1) when this update is not the first update after a transmission gap and where $f_D$ is the Doppler frequency shift at the receiver. It is currently believed that suitable values of the factor c are $1 \leq c \leq 10$ and that c=4 is particularly suitable. The length of a transmission gap is given by $TTI_{inter}$, which tells the UE that every $TTI_{inter}$ transmission time interval is destined for the UE. If this update is the first update after a transmission gap, the filter parameter α is advantageously selected as approximately min(c$f_D$·M/160·1500+3$TTI_{inter}$/1500, 1). As noted above, it is currently believed that suitable values of the factor c are $1 \leq c \leq 10$ and that c=4 is particularly suitable.

Nevertheless, if the transmitter, such as a cellular base station, changes its transmit power on the HS-DSCH in the next TTI, a suitable filter parameter is α=1, which is to say that no old values of the decision boundary from the last TTI can be saved. In a WCDMA system the transmitter informs the UE of power changes on the HS-DSCH from one TTI to the next. The Doppler frequency shift $f_D$ can be estimated in the UE, such as a mobile receiver, by any of many known methods. It is currently believed that suitable values of M are $40 \leq M \leq 320$ and that choosing M=160 gives good performance for transmitter-receiver relative speeds up to 150 km/h.

Figure 7:
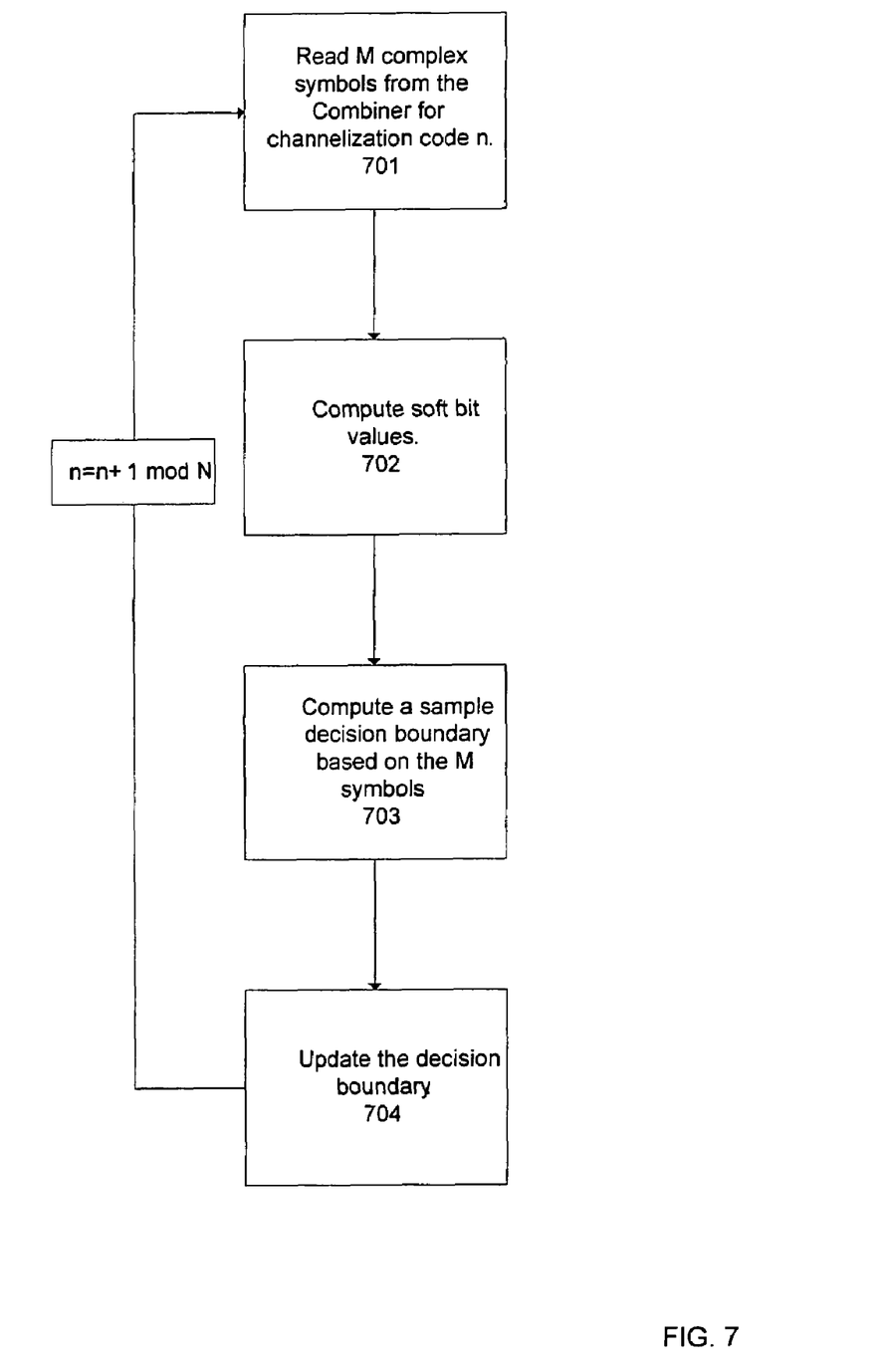
FIG. 7 is a flow chart of another method of decision boundary estimation, latch control, and soft bit value estimation.

In an alternative embodiment, the method illustrated by FIG. 7 can be used for implementation of the decision boundary estimation, latch control, and soft bit value estimation functionality. In this method, there is no need to rerun the combiner 506 for the channelization code n=0.

In step 701, the combiner 506 is run for M symbols of channelization code n, and in step 702, soft bit value estimates are generated by the estimator 514 from the output of the combiner. In step 703, a decision boundary estimate based on the M symbols is determined. In step 704, the decision boundary estimate is updated as follows, with the process flow returning to step 701 after updating, and continuing for the next channelization code n+1 until all N codes have been processed.

Let $d_\Sigma^{(n)}$ be a temporary variable that sums the sample decision boundary $\hat{d}^{(n)}$ over a time interval corresponding to M·N complex symbols, with $d_\Sigma^{(n)}$ given by:

$$d_\Sigma^{(n)} = \begin{cases} 0, n = 0 \\ d_\Sigma^{(n-1)} + \hat{d}^{(n-1)}, n \neq 0 \end{cases}$$

Also let $d_{filter,I}$ reflect the history of the variable $d_\Sigma^{(n)}$. The decision boundary estimate $d_0$ to be applied for channelization code n=0 is $d_0 = d_{filter,I}$, and the decision boundary estimates to be applied for the codes n=1, 2, . . . , N−1 are:

$$d_n = (1-\alpha) d_{filter,I} + \alpha \frac{1}{n} d_\Sigma^{(n-1)}.$$

Once sample decision boundaries $\hat{d}^{(n)}$ have been computed for all N channelization codes, the variable $d_{filter,I}$ is updated according to:

$$d_{filter,I+1} = (1-\alpha) d_{filter,I} + \alpha \frac{1}{N} d_\Sigma^{(N)}.$$

As in the method described above in connection with FIG. 6, the filter parameter a is selected as approximately min $(cf_D \cdot M/160 \cdot 1500, 1)$ when this is not the first update after a transmission gap and as approximately $\min(cf_D \cdot M/160 \cdot 1500 + 3TTI_{inter}/1500, 1)$ when this is the first update after a transmission gap. Also as described above, it is currently believed that suitable values of the factor c are $1 \leq c \leq 10$, that c=4 is particularly suitable, that $\alpha=1$ if the transmitter changes the power on the HS-DSCH in the next TTI, and that M=160 gives good performance for transmitter-receiver relative speeds up to about 150 km/h.

In practice, the algorithm depicted in FIG. 7 may entail running the combiner 506, for the very first symbols that are received for the first channelization code n=0, without computing soft bit values, so as to initialize $d_{filter,I}$ in step 704. It is also currently believed that the algorithm in FIG. 7 is particularly advantageous when $TTI_{inter}$ is unity and the Doppler frequency shift is low, e.g., $f_D < 30$ Hz.

In yet another alternative embodiment, steps 607 and 608 may be carried out only for channelization codes n=0, 1, . . . , $N_{red}-1$, where the number $N_{red}$ of channelization codes used for a decision boundary is less than or equal to the total number N of channelization codes.

It will be appreciated that the procedures described above are carried out repetitively as necessary to respond to the time-varying characteristics of the channel between the transmitter and receiver. To facilitate understanding, many aspects of the invention are described in terms of sequences of actions to be performed by, for example, elements of a programmable computer system. It will be recognized that the various actions could be performed by specialized circuits (e.g., discrete logic gates interconnected to perform a specialized function or application-specific integrated circuits), by program instructions executed by one or more processors, or by a combination of both.

Moreover, the invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fiber, and a portable compact disc read only memory (CD-ROM).

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A receiver that recovers complex symbols transmitted through a propagation channel as modulated symbols impressed on a carrier signal and distinguished by respective channelization codes, comprising:
   a path estimator that selects at least one multi-path delay for received complex symbols;
   a rake processor that multiplies chips in a chip sequence with at least a corresponding channelization code based on at least one multi-path delay selected by the path estimator and generates a set of symbols corresponding to the channelization codes and multi-path delays;
   a channel estimator that generates estimates of an impulse response of the propagation channel for the corresponding multi-path delay;
   a combiner that multiplies symbols for a multi-path delay with complex conjugates of corresponding impulse response estimates generated by the channel estimator and reproduces the modulated symbols that were transmitted;
   a decision boundary estimator/latch controller that generates estimates of a decision boundary based on reproduced modulated symbols;
   a latch, wherein the latch is responsive to the decision boundary estimator/latch controller;
   a soft bit value estimator that generates, for respective channelization codes, estimates of bit values of complex symbols based on the decision boundary estimates; and
   a decoder;
   wherein when the latch is in a first state, the decision boundary estimator generates decision boundary estimates and the soft bit value estimator does not generate soft bit values, and when the latch is in a second state, the decision boundary estimator generates decision boundary estimates and the soft bit value estimator generates soft bit values, and decision boundary estimates used for symbols from a channelization code are generated from symbols from at least one different channelization code.

2. The receiver of claim 1, wherein the receiver further comprises a Hybrid ARQ (HARQ) buffer that stores and combines generated soft bit values for retransmissions of a block until the block has been successfully decoded.

3. The receiver of claim 2, wherein the receiver further includes a deinterleaver that re-orders symbols.

4. The receiver of claim 3, wherein the HARQ buffer and the deinterleaver are combined, and generated soft bit values are not removed from the HARQ buffer until either a transmitted transport block has been decoded correctly by the decoder or a removal instruction is received.

5. The receiver of claim 1, wherein the receiver receives a plurality N of channelization codes and updates decision boundary estimates every M symbols for each channelization code.

6. The receiver of claim 1, wherein the decision boundary estimate for a channelization code is generated using received symbols for the channelization code and a history of decision boundary estimates.

7. The receiver of claim 1, wherein the decision boundary estimates for a first plurality of channelization codes are generated using received symbols for the first plurality of channelization codes, a history of decision boundary estimates, and at least one of a second plurality of decision boundary estimates.

8. The receiver of claim 7, wherein the history of decision boundary estimates comprises a filtered decision boundary estimate.

9. The receiver of claim 7, wherein the decision boundary estimate for the channelization code is computed twice.

10. A method in a receiver of determining decision boundary estimates based on received symbols from one or more channelization codes, comprising the step of:
    determining a decision boundary for a respective channelization code using the received symbols and at least one decision boundary estimate determined for another channelization code.

11. The method of claim 10, wherein the receiver has a combiner and a latch, and further comprising the steps of:
    reading from the combiner a plurality M of symbols for a channelization code;
    determining whether the channelization code is the first channelization code;
    if the channelization code is the first channelization code, determining whether a latch is open or closed; and
    if the latch is determined to be closed, opening the latch, running the combiner for M symbols, and computing a decision boundary estimate.

12. The method of claim 11, wherein the decision boundary estimate for a channelization code is computed using received symbols for the channelization code and a history of decision boundary estimates.

13. The method of claim 12, wherein the history of decision boundary estimates comprises a filtered decision boundary estimate.

14. The method of claim 12, wherein the decision boundary estimate for the channelization code is computed twice.

15. The method of claim 11, wherein the decision boundary estimates for a first plurality of channelization codes are computed using received symbols for the first plurality of channelization codes, a history of decision boundary estimates, and at least one of a second plurality of decision boundary estimates.

16. The method of claim 11, wherein a sample decision boundary $\hat{d}^{(n)}$ based on M complex symbols s from a channelization code n is given by:

$$\hat{d}^{(n)} = \frac{\kappa}{2M} \sum_{m=1}^{M} |\text{Re } s_m| + |\text{Im } s_m|$$

where $\kappa$ is a noise-compensation factor.

17. The method of claim 16, wherein $\kappa$ is 0.95.

18. The method of claim 11, further comprising the step of generating soft bit value estimates, wherein soft bit value estimates are given by:

$\hat{b}_1 = \text{Re } s$ $\hat{b}_2 = \text{Im } s$ $\hat{b}_3 = \rho(d - \text{Re } s)$ for $\text{Re } s > 0$ $\hat{b}_3 = \rho(d + \text{Re } s)$ for $\text{Re } s \leq 0$ $\hat{b}_4 = \rho(d - \text{Im } s)$ for $\text{Im } s > 0$ $\hat{b}_4 = \rho(d + \text{Im } s)$ for $\text{Im } s \leq 0$ where s is a complex symbol representing four soft bit values b1, b2, b3, b4; Re s is the real part of s; Im s is the imaginary part of s; $\rho$ is a compensation factor; and d is the decision boundary.

19. The method of claim 18, wherein the compensation factor $\rho$ compensates for limited resolutions of the soft bit value estimates $\hat{b}_1, \hat{b}_2, \hat{b}_3, \hat{b}_4$.

20. The method of claim 19, wherein $\rho$ is 0.75.

21. The method of claim 20, wherein the decision boundary estimate for a channelization code is computed using received symbols for the channelization code and a history of decision boundary estimates.

22. The method of claim 21, wherein the history of decision boundary estimates comprises a filtered decision boundary estimate.

23. The method of claim 21, wherein the decision boundary estimate for the channelization code is computed a first time and a second time, and the soft bit values are not estimated for the first computation of the decision boundary estimate.

24. The method of claim 18, wherein the decision boundary estimates for a first plurality of channelization codes are computed using received symbols for the first plurality of channelization codes, a history of decision boundary estimates, and at least one of a second plurality of decision boundary estimates.

25. The method of claim 11, wherein if the latch is determined to be open, the latch is closed and soft bit value estimates are generated using the computed decision boundary estimate.

26. The method of claim 11, wherein if the channelization code is not the first channelization code, soft bit value estimates are generated based on at least a last-computed decision boundary estimate.

27. The method of claim 11, wherein sample decision boundary estimates are computed only for channelization codes n=0, 1, . . . , $N_{red}-1$, where $N_{red}$ is less than or equal to a total number of channelization codes.

28. The method of claim 10, wherein a decision boundary estimate $d_0$ for a first channelization code n=0 is given by:

$$d_0 = (1-\alpha)d_{filter,l} + \alpha d_\Sigma^{(0)}$$

and decision boundary estimates $d_n$ for channelization codes n=1, 2, ..., N-1 are given by:

$$d_n = (1-\alpha)d_{filter,l} + \alpha \frac{1}{n} d_\Sigma^{(n-1)}$$

where $\alpha$ is a filter parameter; $d_{filter,l}$ is given by:

$$d_{filter,l+1} = (1-\alpha)d_{filter,l} + \alpha \frac{1}{N} d_\Sigma^{(N)}; \text{ and}$$

$d_\Sigma^{(n)}$ is given by:

$$d_\Sigma^{(n)} = \begin{cases} \hat{d}^{(0)}, n = 0 \\ d_\Sigma^{(n-1)} + \hat{d}^{(n)}, n \neq 0. \end{cases}$$

29. The method of claim 28, wherein the filter parameter $\alpha$ is one of unity, approximately $\min(cf_D \cdot M/160 \cdot 1500, 1)$, and approximately $\min(cf_D \cdot M/160 \cdot 1500 + 3TTI, 1)$, where c is a factor, $f_D$ is a Doppler frequency shift, and TTI is a transmission time interval.

30. The method of claim 10, further comprising the step of determining soft bit value estimates, wherein the soft bit value estimates are determined using received symbols and at least one decision boundary estimate determined for another channelization code.

31. A method of decision boundary estimation and soft bit value estimation, comprising the steps of:
running a combiner for M symbols of a channelization code n;
generating soft bit value estimates from an output of the combiner;
determining a sample decision boundary estimate based on the M symbols; and
updating the decision boundary estimate based on a variable $d_\Sigma^{(n)}$ that sums a sample decision boundary $\hat{d}^{(n)}$ over a time interval corresponding to M·N symbols and on a variable $d_{filter,l}$ that reflects a history of the variable $d_\Sigma^{(n)}$,
wherein sample decision boundary estimates are computed only for channelization codes n=0, 1, ..., $N_{red}$-1, where $N_{red}$ is less than or equal to a total number of channelization codes.

32. The method of claim 31, wherein the history comprises a filtered decision boundary estimate.

33. The method of claim 32, wherein the decision boundary estimate for the channelization code is computed twice.

34. The method of claim 31, wherein the decision boundary estimates for a first plurality of channelization codes are computed using received symbols for the first plurality of channelization codes, a history of decision boundary estimates, and at least one of a second plurality of decision boundary estimates.

35. The method of claim 31, wherein the variable $d_\Sigma^{(n)}$ is given by:

$$d_\Sigma^{(n)} = \begin{cases} 0, n = 0 \\ d_\Sigma^{(n-1)} + \hat{d}^{(n-1)}, n \neq 0 \end{cases}.$$

36. The method of claim 35, wherein a decision boundary estimate $d_0$ for a channelization code n=0 is $d_0 = d_{filter,l}$, and decision boundary estimates for channelization codes n=1, 2, ..., N-1 are:

$$d_n = (1-\alpha)d_{filter,l} + \alpha \frac{1}{n} d_\Sigma^{(n-1)}.$$

37. The method of claim 36, wherein the variable $d_{filter,l}$ is updated according to:

$$d_{filter,l+1} = (1-\alpha)d_{filter,l} + \alpha \frac{1}{N} d_\Sigma^{(N)}$$

where $\alpha$ is a filter parameter.

38. The method of claim 36, wherein the filter parameter $\alpha$ is one of unity, approximately $\min(cf_D \cdot M/160 \cdot 1500, 1)$, and approximately $\min(cf_D \cdot M/160 \cdot 1500 + 3TTI, 1)$, where c is a factor, $f_D$ is a Doppler frequency shift, and TTI is a transmission time interval.

39. A computer-readable medium containing a computer program for determining decision boundary estimates based on received symbols from one or more channelization codes in a receiver, wherein the computer program performs the step of:
determining a decision boundary for a respective channelization code using received symbols and at least one decision boundary estimate determined for another channelization code.

40. The computer-readable medium of claim 39, wherein the computer program further performs the step of determining soft bit value estimates, wherein the soft bit value estimates are determined using received symbols and at least one decision boundary estimate determined for another channelization code.

* * * * *

UNITED STATES PATENT AND TRADEMARK OFFICE
CERTIFICATE OF CORRECTION

PATENT NO. : 7,376,195 B2
APPLICATION NO. : 10/763755
DATED : May 20, 2008
INVENTOR(S) : Jonsson et al.

It is certified that error appears in the above-identified patent and that said Letters Patent is hereby corrected as shown below:

In Column 5, Line 13, delete "$d_{filter,I}$," and insert -- $d_{filter,l}$ --, therefor.

In Column 7, Line 11, delete "$b_1, b_2, b_3, b_4$" and insert -- $\hat{b}_1, \hat{b}_2, \hat{b}_3, \hat{b}_4$ --, therefor.

In Column 8, Line 2, delete "$d_{filter,I}$," and insert -- $d_{filter,l}$ --, therefor.

In Column 8, Line 6, delete "$d_{filter,I}$," and insert -- $d_{filter,l}$ --, therefor.

In Column 8, Line 23, delete "$d_{filter,I}$," and insert -- $d_{filter,l}$ --, therefor.

In Column 9, Line 10, delete "$d_{filter,I}$," and insert -- $d_{filter,l}$ --, therefor.

In Column 9, Line 12, delete "$d_o = d_{filter,I}$," and insert -- $d_o = d_{filter,l}$, --, therefor.

In Column 9, Line 20, delete "$d_{filter,I}$," and insert -- $d_{filter,l}$ --, therefor.

In Column 9, Line 41, delete "$d_{filter,I}$," and insert -- $d_{filter,l}$ --, therefor.

In Column 12, Lines 19-27, in Claim 18, delete "
$$\hat{b}_1 = Re\ s$$
$$\hat{b}_2 = Im\ s$$
$$\hat{b}_3 = \rho(d - Re\ s) \text{ for } Re\ s > 0$$
$$\hat{b}_3 = \rho(d + Re\ s) \text{ for } Re\ s \leq 0$$
$$\hat{b}_4 = \rho(d - Im\ s) \text{ for } Im\ s > 0$$
$$\hat{b}_4 = \rho(d + Im\ s) \text{ for } Im\ s \leq 0$$
"

and insert --
$$\hat{b}_1 = Re\ s$$
$$\hat{b}_2 = Im\ s$$
$$\hat{b}_3 = \rho(d - Re\ s) \text{ for } Re\ s > 0$$
$$\hat{b}_3 = \rho(d + Re\ s) \text{ for } Re\ s \leq 0$$
$$\hat{b}_4 = \rho(d - Im\ s) \text{ for } Im\ s > 0$$
$$\hat{b}_4 = \rho(d + Im\ s) \text{ for } Im\ s \leq 0$$
--, therefor.

UNITED STATES PATENT AND TRADEMARK OFFICE
CERTIFICATE OF CORRECTION

PATENT NO. : 7,376,195 B2
APPLICATION NO. : 10/763755
DATED : May 20, 2008
INVENTOR(S) : Jonsson et al.

It is certified that error appears in the above-identified patent and that said Letters Patent is hereby corrected as shown below:

In Column 12, Line 30, in Claim 18, delete "b1, b2, b3, b4" and insert -- $\bar{b}_1, \bar{b}_2, \bar{b}_3, \bar{b}_4$ --, therefor.

In Column 14, Line 26, in Claim 37, delete "$d_{filter,i}is$" and insert -- $d_{filter,1}$ is --, therefor.

Signed and Sealed this

Seventeenth Day of February, 2009

JOHN DOLL
*Acting Director of the United States Patent and Trademark Office*